(12) United States Patent
Asnani et al.

(10) Patent No.: US 9,174,855 B2
(45) Date of Patent: Nov. 3, 2015

(54) TRIBUTYL PHOSPHATE-NITRATE SOLVENT EXTRACTION PROCESS FOR PRODUCING HIGH PURITY NUCLEAR GRADE RARE EARTH METAL OXIDES

(75) Inventors: Kumar Chandru Asnani, Mumbai (IN); Venkata Siva Rama Ravi Kanth Mukku, Hyderabad (IN); Prakash Buddha, Hyderabad (IN); Jayaraj Raigiri, Hyderabad (IN)

(73) Assignee: The Secretary, Department of Atomic Energy, Government of India, Mumbai (IN)

( * ) Notice: Subject to any disclaimer, the term of this patent is extended or adjusted under 35 U.S.C. 154(b) by 127 days.

(21) Appl. No.: 13/877,184

(22) PCT Filed: Oct. 1, 2010

(86) PCT No.: PCT/IN2010/000654
§ 371 (c)(1),
(2), (4) Date: May 31, 2013

(87) PCT Pub. No.: WO2012/042525
PCT Pub. Date: Apr. 5, 2012

(65) Prior Publication Data
US 2013/0259777 A1    Oct. 3, 2013

(51) Int. Cl.
| | | |
|---|---|---|
| *C01G 25/00* | (2006.01) |
| *C01G 27/00* | (2006.01) |
| *C01G 33/00* | (2006.01) |
| *C01G 35/00* | (2006.01) |
| *C01G 43/00* | (2006.01) |
| *C01G 56/00* | (2006.01) |
| *G21C 19/46* | (2006.01) |
| *G21F 9/12* | (2006.01) |

(52) U.S. Cl.
CPC ............ *C01G 25/003* (2013.01); *C01G 27/003* (2013.01); *C01G 33/003* (2013.01); *C01G 35/003* (2013.01); *C01G 43/003* (2013.01); *C01G 56/001* (2013.01); *G21C 19/46* (2013.01); *G21F 9/12* (2013.01); *G21F 9/125* (2013.01); *Y02W 30/883* (2015.05)

(58) Field of Classification Search
None
See application file for complete search history.

(56) References Cited

U.S. PATENT DOCUMENTS

| | | | | |
|---|---|---|---|---|
| 2,875,023 | A | * | 2/1959 | Galvanek, Jr. .................. 423/10 |
| 2,995,588 | A | | 8/1961 | Seaborg |
| 3,052,513 | A | * | 9/1962 | Crouse, Jr. ........................ 423/9 |
| 3,458,290 | A | | 7/1969 | Hultgren |

FOREIGN PATENT DOCUMENTS

GB        991418 A      5/1965

* cited by examiner

*Primary Examiner* — Steven Bos
(74) *Attorney, Agent, or Firm* — Patent Central LLC; Stephan A. Pendorf

(57) ABSTRACT

An improved process for the preparation of high purity rare metal compounds such as oxides utilizing TBP (Tri-Butyl Phosphate)-nitrate solvent extraction technique adapted to manufacture nuclear grade rare metal compounds such as zirconium oxide wherein the said process substantially aids in reducing the specific generation of ammonium nitrate effluent volume thereby increasing its concentration when the said effluent comprising ammonium nitrate and ammonium sulphate are utilized for stripping of the said rare metal compound from the organic solvent in the said process of production of high purity rare metal oxide powder.

9 Claims, 4 Drawing Sheets

TRIBUTYL PHOSPHATE-NITRATE SOLVENT EXTRACTION PROCESS FOR PRODUCING HIGH PURITY NUCLEAR GRADE RARE EARTH METAL OXIDES

FIELD OF THE INVENTION

The present invention particularly relates to an improved process for the preparation of high purity rare metal compounds such as oxides utilizing TBP (Tri-Butyl. Phosphate)-nitrate solvent extraction technique adapted to manufacture nuclear grade rare metal compounds such as zirconium oxide. More particularly, the process of the present invention substantially aids in reducing the specific generation of ammonium nitrate effluent volume thereby increasing its concentration when the said effluent comprising ammonium nitrate and ammonium sulphate are utilized for stripping of the said rare metal compound from the organic solvent in the process for the production of high purity rare metal oxide powder. Also the process of the present invention can be extended to the manufacture of nuclear grade rare metal compounds such as oxides of Uranium, Plutonium, Hafnium, Niobium, Tantalum and the like.

BACKGROUND ART

In the production of high purity rare metal oxide powder such as zirconium oxide powder, zirconium present as the raw material Zircon sand is converted to soluble form after silica separation through the caustic fusion route. The said soluble form of zirconium is then dissolved in nitric acid and subjected to purification with respect to hafnium, titanium and other impurities using solvent extraction. This liquid-liquid extraction process is the heart of the plant and it comprises of three operations namely, selective extraction of zirconium from the feed solution, scrubbing or back extraction for removal of co-extracted hafnium and titanium from the solvent & finally stripping of zirconium from the loaded solvent using De-mineralized water (DMW) to generate pure zirconium nitrate solution.

Thus the said pure zirconium nitrate solution is further precipitated using ammonium hydroxide solution along with trace quantities of sulphuric acid. The resultant zirconium hydroxide is processed to provide an oxide product. In this process the nitrate present along with zirconium gets converted into ammonium nitrate and ammonium sulphate, which is required to be disposed as effluent as illustrated in FIG. 1.

Though the above mentioned solvent extraction process is capable of producing high purity zirconium nitrate solution, it has numerous drawbacks as discussed hereunder:
i) The process generates high amount of ammonium nitrate effluent in the order of 25000 liters for every MT of $ZrO_2$ produced wherein regular disposal of this large quantity of effluent is mandatory and therefore problematic;
ii) The said effluent in being dilute containing only about 180 g/l of ammonium nitrate makes its disposal further commercially unattractive;
iii) Low stripping efficiency of De-mineralized water (DMW) requires the use of large amount of the stripping solution-DMW to avoid product losses through the solvent. Approximately about 1 g/l of zirconium remains unstripped in the stripped solvent using DMW as the stripping solution.

Thus as apparent and evident from the abovesaid that though the commonly known TBP (Tri-Butyl Phosphate)-nitrate solvent extraction process capable of producing high purity rare metal nitrate solution to provide for an active oxide product is highly prevalent, the said process is lined with a string of aforesaid disadvantages that need to be improved upon to necessitate the provision of a more convenient and efficient process that would lead to a substantial reduction in ammonium nitrate effluent volume to thereby increase its concentration to make its disposal commercially attractive, which said efficient process would also simultaneously induce low rare metal losses in the stripped solvent.

OBJECTS OF THE INVENTION

It is thus the basic object of the present invention to provide for an efficient and industrially applicable process for the production of high purity nuclear grade rare metal compounds such as zirconium oxide powder with substantial reduction in the specific generation of ammonium nitrate effluent volume.

Another object of the present invention is to increase the concentration of ammonium nitrate in the effluent generated in the process of production of high purity nuclear grade rare metal compounds to make its disposal commercially attractive.

Yet another object of the present invention is to substantially reduce rare metal losses in the stripped solvent in the process of production of the said high purity nuclear grade rare metal compounds to thereby increase the yield of the rare in the pure metal nitrate solution thus obtained that is to be proceeded for the rare metal hydroxide precipitation.

SUMMARY OF THE INVENTION

Thus according to the basic aspect of the invention there is provided a TBP (Tri-Butyl Phosphate)-nitrate based solvent extraction process for the production of high purity nuclear grade rare metal oxides comprising subjecting the ammonium nitrate-ammonium sulphate effluent generated in the said solvent extraction process to recycling as a stripping agent/solution such as to efficiently strip the metal nitrate values from the said solvent stream.

According to a preferred aspect of the invention there is provided the said TBP (Tri-Butyl Phosphate)-nitrate based solvent extraction process wherein the said recycling of the ammonium nitrate-ammonium sulphate effluent generated in the process as said stripping agent/solution aids in the volume reduction and increased concentration of the said effluent and render its disposal attractive.

According to a another aspect of the invention there is provided the TBP (Tri-Butyl Phosphate)-nitrate based solvent extraction process comprising recycling of the ammonium nitrate-ammonium sulphate effluent generated in the process as said stripping agent/solution to minimize the rare metal loss in the stripped solvent and increase the concentration of rare metal nitrate solution and thereby increase stripping efficiency.

According to yet another preferred aspect of the process of the present invention there is provided the said TBP (Tri-Butyl Phosphate)-nitrate based solvent extraction process wherein preferably the effluent ammonium nitrate and ammonium sulphate concentrations in the range of 0 to 200 g/l and 30 to 100 g/l respectively to achieve efficient stripping wherein maximum stripping efficiency is preferably attained by the effluent involving about 200 gpl ammonium nitrate and about 30 gpl ammonium sulphate.

Advantageously, in the said TBP (Tri-Butyl Phosphate)-nitrate based solvent extraction process the sulphate anion in the said ammonium nitrate-ammonium sulphate effluent stripping agent complexes with the rare metal ions and favours in the stripping of the metal from the organic phase into the aqueous phase.

In yet another aspect of the present invention there is provided a TBP (Tri-Butyl Phosphate)-nitrate based solvent extraction process comprising the steps of liquid-liquid extraction process involving:

i) carrying out extraction of a selective rare metal from the feed solution;

ii) scrubbing or back extraction for removal of any other co-extracted rare metal impurities from said solvent thereby providing a purified loaded solvent;

iii) subjecting the thus purified loaded solvent to the step of stripping of the said selective rare metal from the solvent involving the ammonium nitrate-ammonium sulphate effluent generated in the process and thus maintaining the right chemical ambience to the highly hydrolysable rare metal species to be stripped wherein the sulphate anion of said ammonium sulphate of the effluent forms aqueous soluble complex salt of the rare metal ion such as to be stripped effectively by the said effluent and obtaining pure rare metal nitrate solution therefrom; and iv) precipitation of rare metal hydroxide by ammonium hydroxide solution containing trace quantity of sulphuric acid and obtaining the said high purity nuclear grade selective rare metal oxide therefrom.

Preferably, in the said TBP (Tri-Butyl Phosphate)-nitrate based solvent extraction process the said isolation of high purity rare metals oxides include Zirconium, Uranium, Plutonium, Hafnium, Niobium, Tantalum and the like from its raw material mineral and/or ore.

According to yet another preferred aspect of the present invention there is provided a TBP (Tri-Butyl Phosphate)-nitrate based solvent extraction process wherein reduction of ammonium nitrate effluent volume attained is in the range of 12000 to 14000 liters for every MT (Metric Ton) of $ZrO_2$ produced.

According to still another preferred aspect of the present invention there is provided a TBP (Tri-Butyl Phosphate)-nitrate based solvent extraction process wherein the said liquid-liquid extraction involving the ammonium nitrate-ammonium sulphate effluent as a stripping agent is carried out such as to achieve substantial reduction in loss of rare metal to only about 0.3 to 0.4 gpl in the stripped solvent with increase in rare metal concentration in the said pure rare metal nitrate solution in the range of 120 to 130 gpl with yield of >98% rare metal oxide product and an increase in ammonium nitrate concentration in the said effluent in the range of 380 to 400 gpl thereby converting it commercially attractive for disposal.

More advantageously, the said process comprises a drying rate of 70 to 73 kg/hr for drying of the wet precipitated rare metal hydroxide cake with increased rate of drying.

Particularly, the said ammonium nitrate-ammonium sulphate effluent as a stripping agent/solution is used to strip the soluble rare metal nitrate from the solvent stream for the production of high purity nuclear grade rare metal oxides by way of the present invention.

The details of the invention, its objects and advantages are explained hereunder in greater detail in relation to non-limiting exemplary illustrations as per the following exemplary illustrations:

DETAILED DESCRIPTION OF THE INVENTION

Figure 1:
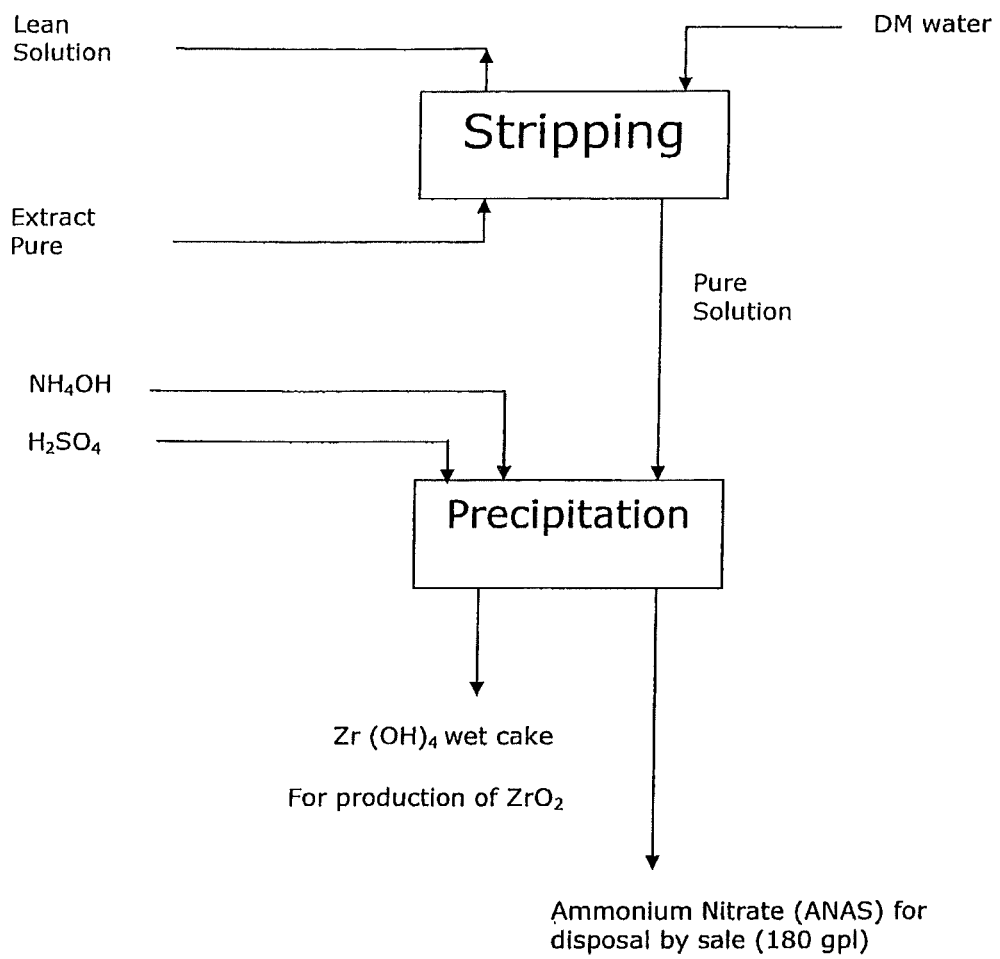
FIG. 1: reveals a flowchart of the prior known solvent extraction process for the manufacture of rare metal oxide compounds.

As discussed herein before, the present invention provides for an improved method for the production of high purity rare metal compounds such as oxides with substantial reduction in the specific generation of ammonium nitrate effluent volume that thereby leads to the increased concentration of ammonium nitrate in the said effluent making its disposal commercially attractive. The method of the present invention also reduces rare metal losses in the stripped solvent to increase the yield of the rare metal in the rare metal nitrate solution that is proceeded to the precipitation step of formation of rare metal hydroxide also obtained in higher yields.

Therefore the method of the present invention overcomes the disadvantages of the previously used (demineralized-water) DM water stripping process, (i) by decreasing the specific generation of ammonium nitrate effluent volume; (ii) by increasing the concentration of ammonium nitrate in effluent to make its disposal commercially attractive and (iii) increasing the stripping effectiveness to prevent rare metal losses in the process.

The significant finding of the present invention leading to an improved process for the production of high purity rare metal compounds such as rare metal oxide powder thus overcomes all the above discussed known hurdles of the process and is solely based on the fact that the ammonium nitrate being generated as effluent in one of the prior art process step is utilized by way of the process of the present invention as an effective stripping solution in place of (demineralized-water) DM water that was prior used as the stripping solution during the rare metal nitrate stripping process step.

Thus the process of the present invention provides for an efficient method to strip the rare metal nitrate values from the solvent stream by recycling the ammonium nitrate effluent for utilizing it as a stripping agent/solvent instead of (demineralized-water) DM water. The selective advantages achievable by the process of the present invention for the production of high purity rare metal compound such as rare metal oxide and preferably zirconium oxide powder in data form are illustrated below wherein:

i) the said improved process generates reduced amount of ammonium nitrate effluent which is 12000 liters of ammonium nitrate effluent for every MT of $ZrO_2$ produced against 25000 liters for every MT of $ZrO_2$ produced in the prior art process.

ii) disposal of ammonium nitrate effluent thus becomes commercially attractive due to increase in ammonium nitrate concentration to 400 g/l against 180 g/l of the prior processes.

iii) with the increase in stripping efficiency using said ammonium nitrate effluent the zirconium loss in the stripped solvent is reduced from 1 g/l of the prior art processes to 0.4 g/l.

In addition to the above mentioned advantages, the said improved process also provides for an (i) an increase in Zirconium concentration in the so produced zirconium nitrate solution to about 130 g/l against about 100 g/l concentration as produced in the prior process; (ii) an increase in the drying rate of wet zirconium hydroxide cake by about 52%—from 48 Kg/hr of the prior art process to 73 Kg/hr. This increase in drying rate is attributed to the lower moisture content in the wet zirconium hydroxide cake produced through the modified process.

Figure 2:
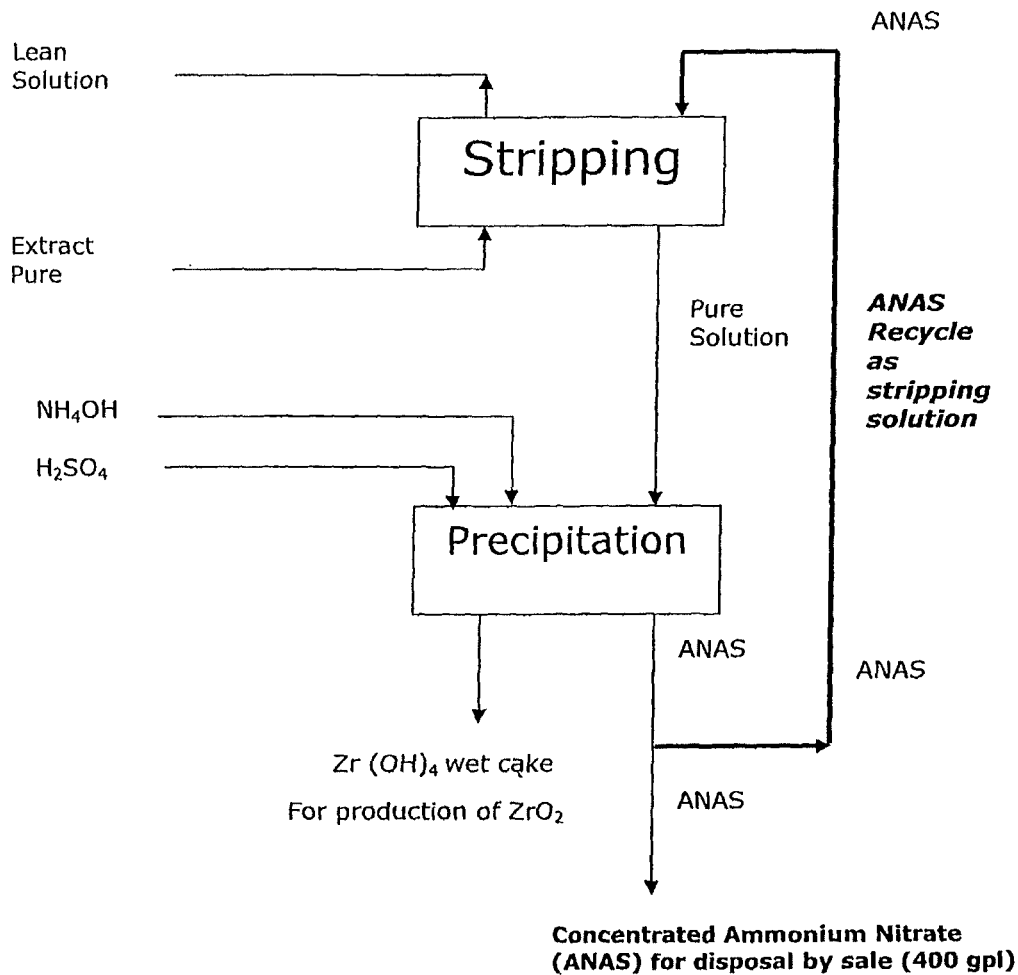
FIG. 2: reveals a flowchart illustrating the present process of the invention.

According to the method of the present invention, during the liquid-liquid extraction process after the selective extraction of zirconium from the feed solution and further purification with respect to hafnium & titanium in the scrubbing operation, the purified loaded solvent containing Zirconium as a feed is proceeded for the stripping operation as illustrated in FIG. 2.

Since the zirconium values are to be recovered from the loaded solvent, thereby enabling recycle of the lean solvent, DM water was being utilized as the stripping solution in the prior process as described in FIG. 1. For about 5 parts of solvent, about 1 part of DM water is required to enable effective stripping wherein according to the method of the present invention as illustrated in FIG. 2 the ammonium nitrate effluent generated in the process after precipitation of $Zr(OH)_4$ having a concentration of about 180 g/l is recycled in place of DM water to be utilized for stripping purposes. For about 5 parts of solvent, about 0.7 to 0.8 parts of ammonium nitrate solution is sufficient for complete stripping of the solvent.

The chemistry behind the stripping process with ammonium nitrate and small amounts of ammonium sulphate as an effluent is based on the fact that the said solution containing ammonium nitrate-ammonium sulphate provides the necessary chemical ambience due to the presence of common ion electrolytes, which is rightly desirable when highly hydrolysable species of the rare metals such as Zirconium, Uranium, Plutonium etc., are being stripped.

Figure 3:
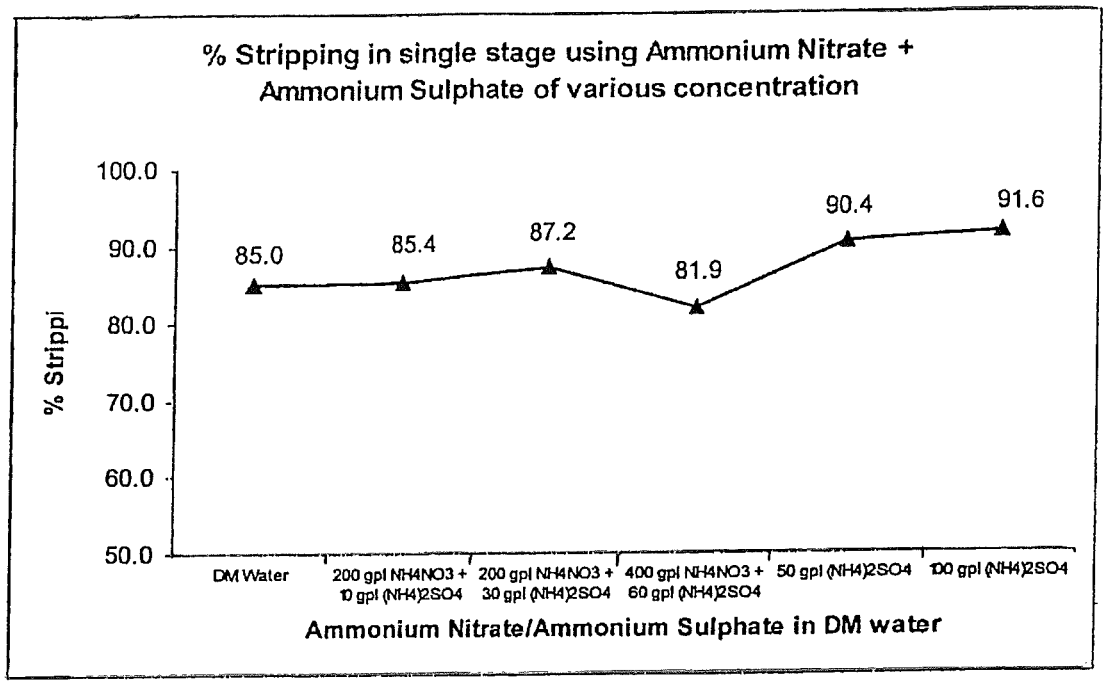
FIG. 3: reveals a graph illustrating the stripping test results containing varying concentrations of ammonium nitrate and ammonium sulphate in the effluent solution.

Secondly, the presence of sulphate anion of ammonium sulphate, which has a considerable degree of complexing ability towards, metals ions, like zirconium help in stripping the zirconium from the organic phase into aqueous phase. Equilibration of zirconium solvent extract with an aqueous solution containing ammonium nitrate and ammonium sulphate results in contact of the adduct namely $Zr(NO_3)_4.2(CH_3CH_2CH_2CH_2)_3PO$ in the organic phase with $(NH_4)_2SO_4$ in the aqueous phase. This leads to the formation of aqueous soluble salts of the type $(NH_4)_2SO_4.Zr(SO_4)_2$ and thus stripping of zirconium becomes relatively more effective as indicated in FIG. 3.

Similar tendency of adduct formation with Tri-Butyl Phosphate is observed for Uranium, Plutonium and the like resulting in adducts like $UO_2(NO_3)_2. 2(CH_3CH_2CH_2CH_2)_3PO$ etc., in organic phase that comes in contact with $(NH_4)_2SO_4$ in the aqueous phase at the time of stripping. This also leads to the formation of aqueous soluble salts of the respective metal ions and thus stripping becomes highly effective by way of the method of the present invention.

Thus the pure zirconium nitrate solution produced in the modified process contains about 130 g/l of zirconium along with 180 g/l ammonium nitrate. This is further precipitated using ammonium hydroxide solution along with trace quantity of sulphuric acid. The resultant zirconium hydroxide is processed to provide the final Zirconium oxide product.

Nitrate present along with zirconium gets converted into ammonium nitrate and ammonium sulphate effluent after the above said precipitation process having a concentration of about 400 g/l as illustrated in FIG. 2.

Recycling of thus produced ammonium nitrate and ammonium sulphate effluent having the said concentration of about 400 g/l resulted in reduction of the stripping effectiveness as indicated in FIG. 3.

Stripping tests using ammonium sulphate alone, though not of much concern in the process of the present invention, was tested to explore the resulting higher effectiveness of stripping due to the formation of aqueous soluble salts of the type $(NH_4)_2SO_4.Zr(SO_4)_2$ as also indicated in FIG. 3.

Figure 4:
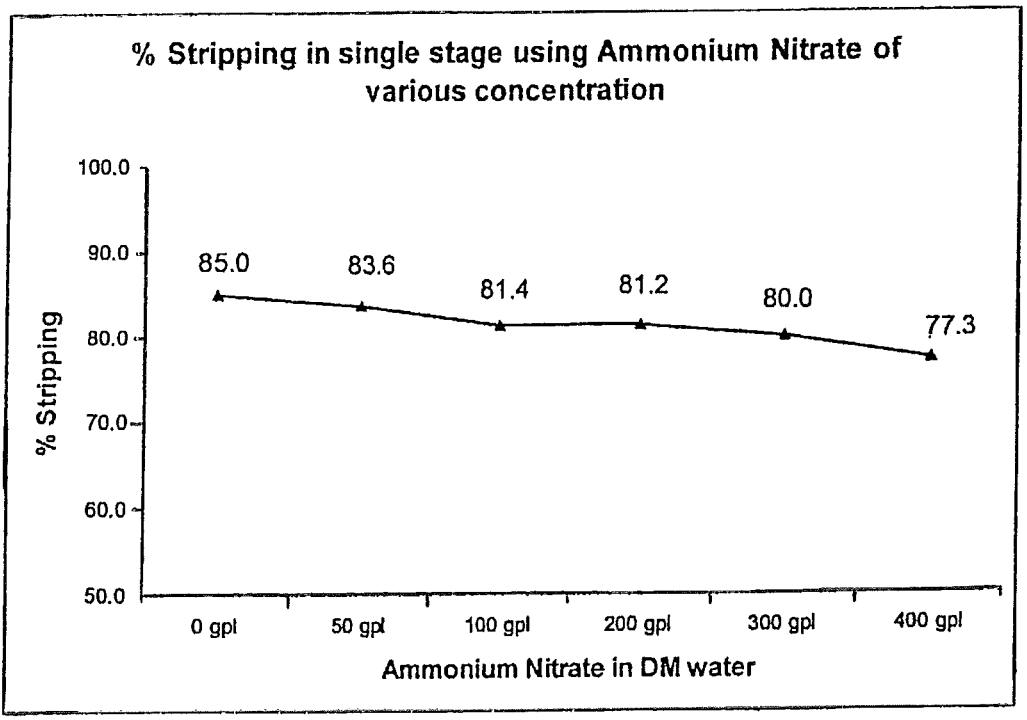
FIG. 4: reveals a graph illustrating the stripping test results containing varying concentrations of ammonium nitrate and in the total absence of ammonium sulphate.

Further stripping effectiveness using solutions with increasing ammonium nitrate concentrations as indicated in FIG. 4 followed a lowering trend even at elevated temperature mainly because of the absence of ammonium sulphate from it.

Figure 5:
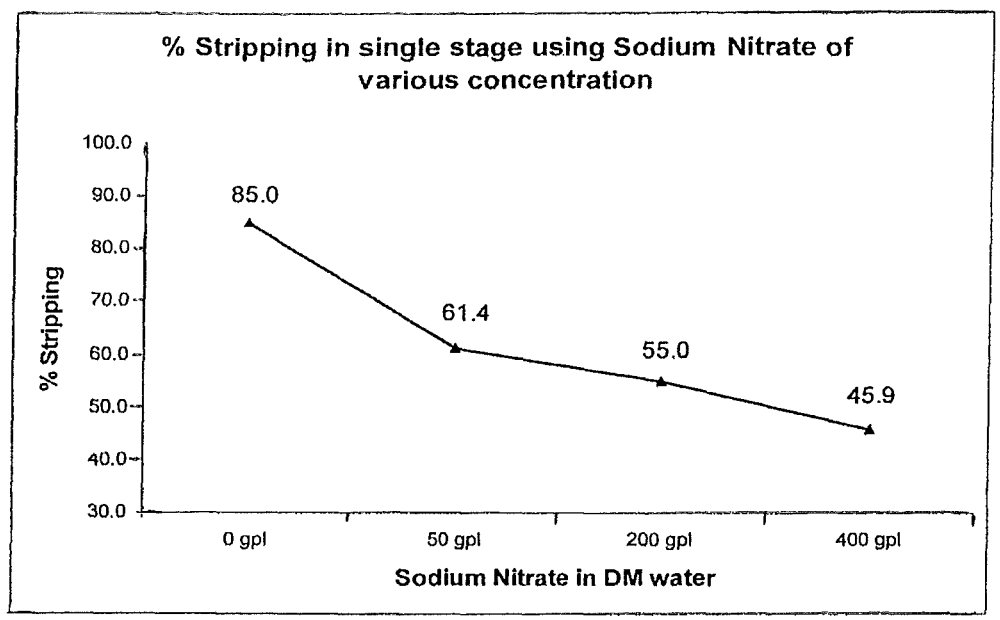
FIG. 5: reveals a graph illustrating the stripping test results containing nitrate salt solution other than ammonium nitrate.

Further stripping tests using nitrate salt solution, other than ammonium nitrate, like sodium nitrate of various concentrations was found to be totally ineffective as indicated in FIG. 5.

The following specific example illustrates the present invention in greater detail. In general, it may be said that the example stated is merely illustrative and should not be construed to limit the scope of the invention.

Examples-I

An air operated mixer settler type of apparatus comprising of alternate mixing columns & settling chambers through which a zirconium loaded solvent solution is passed as a counter current to a stripping solution. Air mixes the two phases in an air lift, and the mixed phase enters into the settling chambers wherein the phases separate and advance to subsequent mixing air lifts in opposite directions. On using such a system as described above, Table I hereunder reveals the parameters obtained by way of the present invention in comparison to the parameters of the already known prior art processes:

TABLE I

Comparison of stripping process parameters

| Parameter | Prior process | Modified process as per the invention |
|---|---|---|
| Number of contact stages | 12 | 12 |
| Loaded solvent feeding rate in lph | 5500 | 5500 |
| Stripping solution | DM water | Ammonium nitrate effluent of concentration 180 gpl |
| Stripping solution rate | 1100 lph | 850 lph |
| Zirconium concentration in loaded solvent | 21 gpl | 21 gpl |
| Zirconium concentration in product - pure zirconium nitrate solution | 100 gpl | 130 gpl |
| Zirconium concentration in the stripped lean solvent | 1 gpl | 0.4 gpl |
| Yield of zirconium product based on feed loaded solvent | 95.2% | >98% |
| Distribution coefficient Zr Org/Aq | 0.17 | 0.12 |
| Final concentration of effluent - Ammonium nitrate | 180 gpl | 400 gpl |

Operation of the stripping unit as per the process of the present invention is carried out to achieve the best balance between the concentration of zirconium in the product and the yield of zirconium. The method of the present invention yields >98% of zirconium product that has a product concentration of around 130 gpl of zirconium.

Thus based on the comparative illustration of the tabulated results, it is apparent that the method of the present invention provides for maximizing the product yield and minimizes the specific generation of effluent. This method of the present invention also has the additional advantages of increase in ammonium nitrate effluent concentration thereby enabling its ready disposal and also further aids in reducing the consumption of DM (demineralized-water) water that renders the process cost-effective.

The technical advancement made by way of the process of the present invention thus relates to substantially stripped metal values of rare metals such as Zirconium, Uranium, Plutonium, Hafnium, Niobium, Tantalum and the like that are thus recovered from the loaded Tri-Butyl Phosphate solvent utilizing the effluent ammonium nitrate as the stripping solution instead of DM (demineralized-water) water that is obtained after the precipitation process of the respective metal hydroxides. The process of the present invention is particularly adaptable to the tonnage production in a continuous plant operation, which requires the attention of only a few individuals. Advantageously, it is thus possible by way of the said process which has high potential for lowering the volume of effluent generation thereby increasing the concentration of its constituents to render its disposal attractive. Also, the process is slated to be cost effective due to its high separation efficiency without involving DM (demineralized-water) against the prior known procedures.

We claim:

1. A TBP (tri-butyl phosphate)-nitrate based solvent extraction process for the production of high purity nuclear grade rare metal oxides comprising:
    subjecting ammonium nitrate-ammonium sulphate effluent generated in a TBP (tri-butyl phosphate)-nitrate based solvent extraction process for the production of high purity nuclear grade rare metal oxides to recycling as a stripping solution so as to strip metal nitrate values from a solvent stream organic phase into an aqueous phase comprising (i) common ion electrolytes based ammonium nitrate-ammonium sulphate effluent to strip hydrolysable rare metal species and (ii) sulphate anion in said ammonium nitrate-ammonium sulphate effluent with complexing ability towards rare metal ions favouring stripping of the rare metal ions from the organic phase into the aqueous phase by equilibration of rare metal solvent extract comprising rare metal nitrate TBP adduct with an aqueous solution containing ammonium nitrate and ammonium sulphate thereby enabling contact of said rare metal nitrate TBP adduct in the organic phase with $(NH_4)_2SO_4$ in the aqueous phase, and
    forming aqueous soluble complex salts of respective rare metal ions in the aqueous phase to favor stripping of the rare metal ion from the organic phase into the aqueous phase for recovery of high purity nuclear grade rare metal oxides from said aqueous phase.

2. The TBP (tri-butyl phosphate)-nitrate based solvent extraction process as claimed in claim 1, wherein for about 5 parts of solvent, about 0.7 to 0.8 parts of ammonium nitrate solution is used for complete stripping of the solvent.

3. The TBP (tri-butyl phosphate)-nitrate based solvent extraction process as claimed in claim 1, wherein the effluent ammonium nitrate and ammonium sulphate concentrations are in the range of 0 to 200 g/l and 30 to 100 g/l respectively to achieve efficient stripping.

4. The TBP (tri-butyl phosphate)-nitrate based solvent extraction process as claimed in claim 3, wherein maximum stripping efficiency is attained by the effluent involving about 200 gpl ammonium nitrate and about 30 gpl ammonium sulphate.

5. The TBP (tri-butyl phosphate)-nitrate based solvent extraction process as claimed in claim 1, comprising liquid-liquid extraction process steps of:
    i) carrying out extraction of a selective rare metal from a feed solution;
    ii) scrubbing or back extraction for removal of any other co-extracted rare metal impurities from said solvent thereby providing a purified loaded solvent;
    iii) subjecting the thus purified loaded solvent to the step of stripping of said selective rare metal from the solvent involving the ammonium nitrate-ammonium sulphate effluent generated in the process and thus maintaining common ion electrolyte based chemical ambience to the highly hydrolysable rare metal species to be stripped wherein the sulphate anion of said ammonium sulphate of the effluent forms aqueous soluble complex salt of the rare metal ion such as to be stripped effectively by said effluent and obtaining pure rare metal nitrate solution therefrom; and
    iv) precipitation of rare metal hydroxide by ammonium hydroxide solution containing trace quantity of sulphuric acid and obtaining said high purity nuclear grade selective rare metal oxide therefrom.

6. The TBP (tri-butyl phosphate)-nitrate based solvent extraction process as claimed in claim 1, wherein said production of high purity rare metal oxides include oxides of zirconium, uranium, plutonium, hafnium, niobium, and tantalum.

7. The TBP (tri-butyl phosphate)-nitrate based solvent extraction process as claimed in claim 1, wherein reduction of ammonium nitrate effluent volume attained is in the range of 12000 to 14000 liters for every metric ton of $ZrO_2$ produced.

8. The TBP (tri-butyl phosphate)-nitrate based solvent extraction process as claimed in claim 5, wherein said liquid-liquid extraction involving the ammonium nitrate-ammonium sulphate effluent as a stripping agent is carried out to achieve substantial reduction in loss of rare metal to only about 0.3 to 0.4 gpl in the stripped solvent with increase in rare metal concentration in said pure rare metal nitrate solution in the range of 120 to 130 gpl with yield of >98% rare metal oxide product and an increase in ammonium nitrate concentration in said effluent in the range of 380 to 400 gpl thereby converting said effluent commercially attractive for disposal.

9. The process as claimed in claim 1 comprising drying wet precipitated rare metal hydroxide cake at a drying rate of 70 to 73 kg/hr.

* * * * *